(12) United States Patent
Movlazada (10) Patent No.: US 8,156,842 B2
(45) Date of Patent: Apr. 17, 2012

(54) ROTARY OSCILLATION DAMPER

(75) Inventor: Parviz Movlazada, Buehlertal (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 463 days.

(21) Appl. No.: 12/396,053

(22) Filed: Mar. 2, 2009

(65) Prior Publication Data

US 2009/0221376 A1 Sep. 3, 2009

(30) Foreign Application Priority Data

Mar. 3, 2008 (DE) .......................... 10 2008 012 372

(51) Int. Cl.
*F16F 15/12* (2006.01)
(52) U.S. Cl. ..................................................... 74/574.4
(58) Field of Classification Search ............... 74/573.12, 74/574.4
See application file for complete search history.

(56) References Cited

U.S. PATENT DOCUMENTS

| 1,813,209 A | * | 7/1931 | Spase | 74/325 |
| 2,196,716 A | * | 4/1940 | Williams | 464/62.1 |
| 6,067,876 A | * | 5/2000 | Lohaus | 74/574.4 |

FOREIGN PATENT DOCUMENTS

| DE | 10242840 | 6/2003 |
| DE | 69716348 | 11/2003 |

* cited by examiner

Primary Examiner — Vicky Johnson
(74) Attorney, Agent, or Firm — Lucas & Mercanti, LLP (57) ABSTRACT

The invention relates to a rotary oscillation damper having an input part and an output part which can be moved relatively and to a limited extent with respect thereto against the influence of at least one energy store. The at least one energy store is in this case supported on one side on a counter bearing and on its other side acts on in each case at least one movement profile, which runs in the circumferential direction, of the input part and output part, in such a manner that, during a relative rotation of the input part and output part with respect to one another, the energy store absorbs energy, and emits it again when the relative rotation is reversed.

11 Claims, 5 Drawing Sheets

ROTARY OSCILLATION DAMPER

This application claims the priority of DE 10 2008 012 372.2 filed Mar. 3, 2008 which is incorporated by reference herein.

BACKGROUND OF THE INVENTION

The invention relates to a rotary oscillation damper having two components which can rotate in a limited manner with respect to one another and against the influence of at least one energy store, specifically an input part and an output part, wherein the at least one energy store has two mutually opposite force absorption points.

Rotary oscillation dampers such as these have become known in particular as torsional oscillation dampers from drive trains of motor vehicles with an internal combustion engine. These dampers are inserted between the internal combustion engine and the gearbox input shaft in order to damp torsional oscillations, which occur as a consequence of drive forces, which act cyclically in a non-uniform manner on the crankshaft and are produced by the combustion processes in the combustion chambers of the internal combustion engine, in clutch disks, two-mass flywheels and/or rotational oscillation dampers in torque converters. In this context, energy stores, for example a plurality of short bow springs distributed over the circumference, or a plurality of bow springs, which are pre-bent onto the insertion diameter, preferably long helical springs arranged radially on the outside, are braced in the circumferential direction between the input part and the output part such that they are compressed during a relative rotation of the components and the load on them is relieved again when the rotation is reversed, thus damping the oscillation amplitudes.

As an alternative to these arrangements, so-called radial spring oscillation dampers are known in which compression or tension springs, which are distributed over the circumference, act at a different radial height on the components which can rotate relative to one another, with the points of action being held firmly in the components, and are mounted such that they can rotate.

SUMMARY OF THE INVENTION

The object of the present invention is to develop such rotary oscillation dampers.

The object is achieved by a rotary oscillation damper having two components which can rotate in a limited manner with respect to one another and against the influence of at least one energy store, specifically an input part and an output part, wherein the at least one energy store has two mutually opposite force absorption points and one of the force absorption points is supported on a counter bearing and the other force absorption point is supported such that it can move along at least one movement profile, which is in each case provided in the circumferential direction of the components. By means of this arrangement, a rotary oscillation damper can be proposed whose energy store is largely independent of the centrifugal force of the rotating rotary oscillation damper. This therefore need not be supported radially outwards between its ends and does not cause any friction forces on corresponding supports, which reduce its energy storage capacity, since its direction of action is aligned in the centrifugal-force direction and it is supported on one of its end surfaces. Furthermore, the force that is created from the energy store on the two components—in this context, this means the input part and the output part—can be largely matched to the requirements by an appropriate configuration of the movement profiles, in such a way that linear, progressive, degressive characteristics, or characteristics which are subdivided into a plurality of steps, can be created over the path of a relative rotation of the components. In this case, during a relative rotation of the components, the energy store which is held fixed on a counter bearing has energy applied to it by movement of its force absorption point that is associated with the movement profiles, and it emits this energy back to the components when the relative rotation is reduced.

By way of example, helical springs can be used as energy stores, or else plate springs which are arranged in a row in appropriate holders or cages and are loaded in compression and/or tension. When arranged loaded in tension, the corresponding helical springs or plate spring packs are hooked in on one side on the counter bearing and on the other side on a rotor or sliding block which is thus braced with respect to the movement profiles. In one preferred embodiment, helical springs or plate spring packs are loaded in compression. In this case, these are braced between the counter bearing and the rotor or sliding block. It is self-evident that helical springs and/or plate springs can be connected one behind the other or in parallel as multistage energy stores, and a plurality of helical springs of different diameter can be interleaved in one another for this purpose.

The counter bearing for the energy store can be arranged radially outside the movement profiles, although one preferred arrangement is proposed in which the counter bearing is arranged radially within the movement profiles. For this purpose, in order to advantageously increase the capacity of the at least one energy store, the counter bearing is arranged on a very small diameter and the movement profiles are arranged radially as far as possible on the outside of the components which can rotate relative to one another. Furthermore, it has been found to be advantageous for the force absorption points to support a plurality of energy stores, which are distributed over the circumference, on a common counter bearing in the form of a bearing ring. For example, this allows at least three, and preferably four to six, energy stores, for example helical springs, to be supported distributed over the circumference on the bearing ring on the one hand and on the input-side and output-side movement profiles on the other hand. This results in the bearing ring being automatically stabilized without any additional radial support, since the bracing forces which occur on the bearing ring compensate for one another on the bearing ring. Alternatively, the bearing ring can be held on one of the two components which can rotate relative to one another or on an additional component, for example a shaft such as a crankshaft, a gearbox input shaft or a component that is fixed to a housing such as a gearbox neck, such that it can rotate by means of a bearing, for example a roller bearing or plain bearing.

The movement profiles on the input part and output part may be the same or different. If the movement profiles are designed to be different, any relative rotation on the two components does not take place symmetrically, but one component is deflected less quickly, under the same influence from the energy store, because it has a flatter movement profile. In addition, when a plurality of energy stores are distributed over the circumference, the movement profiles which are associated with one energy store can vary between the energy stores, thus making it possible, for example, to create different characteristics. In the proposed rotary oscillation damper, it is therefore possible to create an optimum characteristic both by the choice of the capacity and characteristic of the energy store and by variation of the movement profile.

The energy store or stores act or acts on the movement profiles by means of a rotor or sliding block which is connected to the opposite end or force absorption point of the end or force absorption point held in the counter bearing. For this purpose, the sliding block may be equipped with a holder such as a shoe in which, for example, one or more turns of a helical spring is or are held. The sliding block slides on the movement profiles of the input part and output part and, when the two components rotate relative to one another, transmits a relative movement with a preferably radial component to the energy store, thus resulting in the latter being compressed. In particular exemplary embodiments, the sliding block, or a shaft which is connected to an energy store, may contain at least one roller bearing which rolls on the roller profiles. In order to take account of the different rotation directions of the movement profiles, which are associated with the input part and output part, during a relative rotation, different roller bearings are advantageously provided for each movement profile on a shaft such as this. Guides, which flank the roller bearings and radially overlap the tracks can be provided on the sliding blocks or shafts with a plain bearing or roller bearing, and/or grooves can be provided in the sliding block, such that these are axially fixed on the possibly narrow tracks of the movement profiles.

A sliding block which slides on a track on the movement profile has a profile which is matched to the movement profiles of the components. The profiles of the sliding block and movement profiles can be therefore designed in the form of involute tracks. In order to stabilize the position at which the two components are not rotated with respect to one another, a minimum can be provided at this position, at which the profile of the movement profiles rises in both rotation directions of a component. The gradients on the components may be the same in both rotation directions or, for example in the case of a rotary oscillation damper, may have gradients which differ during pulling operation and pushing operation when installed, preferably resulting in a higher gradient and thus greater stiffness of the rotary oscillation damper in the pulling direction than in the pushing direction. The gradients of the tracks, such as sliding tracks of the movement profiles, may be linear, convex or concave such that, depending on the configuration, the characteristic of the rotary oscillation damper may be designed to be correspondingly progressive, linearly degressive, with one step or with a plurality of steps.

In one particularly advantageous exemplary embodiment, a stable arrangement of the sliding block or of the shaft with the roller bearings can be provided in such a manner that one component has two movement profiles and the movement profile of the other component is guided between the movement profiles of the other part. The sliding block or shaft is thus supported by the two outer movement profiles of a component such that it is protected against tilting, and the central movement profile of the other component ensures that the sliding block or the shaft is guided uniformly by both components, when the two components rotate relative to one another. When using a sliding block, the sliding tracks on the two components can be matched to one another such that the friction of the two movement profiles of one component and the friction of the individual movement profile of the other component are comparatively high. This can be achieved, for example, by tribological setting of the sliding coefficients of the sliding tracks, the material thickness of the movement profiles and/or the setting of different gradients of the movement profiles.

The relative movements of the components and in particular of the movement profiles associated with them can be advantageously optimized by the movement profiles being separated from one another by spacing tabs. In this case, all or only one movement profile may have corresponding spacing tabs. When one middle movement profile of one component is being flanked by movement profiles of the other component, spacing tabs may be provided only on the central movement profile.

The movement profiles on the input and output parts may be arranged radially within or radially outside a bearing ring which forms an counter bearing for the energy store. This makes it possible to provide exemplary embodiments whose sliding blocks, which can be moved in the movement profiles, are loaded or are unloaded under the influence of the centrifugal force with respect to the movement profiles. In particular for sliding blocks which are moved with sliding friction being formed on the movement profiles, the movement profiles can be arranged radially within the bearing ring, thus reducing the friction between the sliding blocks and movement profiles when centrifugal forces are acting.

BRIEF DESCRIPTION OF THE DRAWINGS

The invention will be explained in more detail with reference to FIGS. 1 to 9, in which.

DETAILED DESCRIPTION OF THE INVENTION

Figure 1:
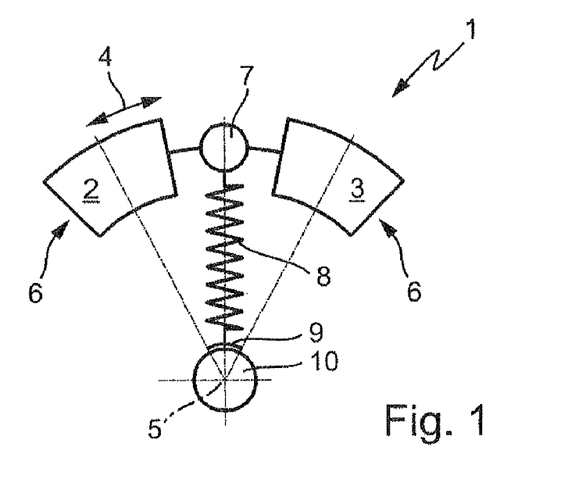
FIG. 1 Shows a schematic illustration of the functional principle of a rotary oscillation damper according to the invention.

FIG. 1 shows a schematic illustration of the functional principle of the proposed rotary oscillation damper 1 with components 6 which can rotate relative to one another in a limited manner about the rotation axis 5 in the direction of the arrow 4 and are referred to as the input part 2 and the output part 3. The components 6 are rotated with respect to one another against the influence of the energy store 8, which is supported on one side on a counter bearing 9 which in turn can be supported on a hub 10 such that it can rotate. The hub 10 may in turn be a gearbox input shaft or the crankshaft and, in addition, can also bear the components 6 such that they can rotate. On the other side of the energy store, this acts on a transmission device 7 which, during rotation of the two components 6 with respect to one another, results in the energy store being compressed by the two components 6, and in the energy store being unloaded when the rotation angle is reversed, with the energy store 8 absorbing energy during rotation of the components 8, and emitting the energy again on unloading. The energy store 8 therefore acts as a buffer store for the energy which is introduced by an oscillation amplitude and is introduced into the rotary oscillation damper 1 when the two components rotate relative to one another. The transmission device 7 in this case has movement profiles which are provided on the components 6 and act on a force absorption point of the energy store, wherein this contains a sliding block, a rotor, a rotary bearing or the like for transmission of the deflection, as initiated by the movement profile, of the energy store. Exemplary embodiments relating to this will be explained in more detail in the following figures. As a result of the arrangement of the energy stores 8, which is virtually radial even during a relative rotation of the components 6, these, in particular, do not exhibit any disturbing friction influences as a result of being supported against centrifugal-force influences, as may be the case in energy stores which are preferably aligned in the circumferential direction and are braced directly between the components. In comparison to an arrangement of the energy stores in the radial direction, in which the energy stores are each held such that they can pivot radially outwards on one component and can pivot radially inwards on the other component at their other end, the proposed rotary oscillation dampers have the particular advantage that the energy stores 8 are not pivoted during relative rotation of the components 6, as a result of which their characteristic remains constant over the rotation angle of the components 16.

Figure 2:
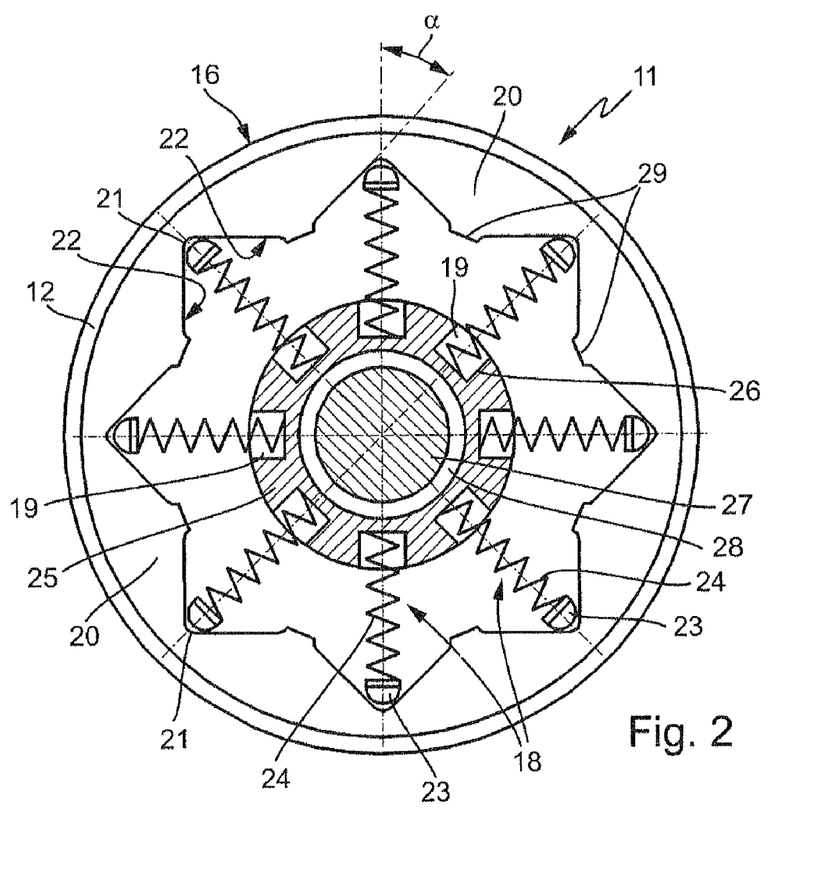
FIG. 2 Shows a view of one exemplary embodiment of a rotary oscillation damper.

FIG. 2 shows an exemplary embodiment of a rotary oscillation damper 11 in a view of a section through the rotary oscillation damper 11 with an input part 12 which, as the component 16, may also be an output part. The input part 12 has a plurality of movement profiles 20, eight distributed over the circumference in the illustrated example, which are integrated in the input part 12. By way of example, the input part 12 is stamped and appropriately shaped from sheet metal and contains the movement profiles 20 as parts requiring no further surface treatment. The movement profiles 20 each have a minimum 21 adjacent to which on both sides in the circumferential direction there are gradients 22 which each have a stop 29, for example in the form of a stop tab, at their end, wherein gradients 22 which are adjacent in the circumferential direction may each have a common stop. In the illustrated exemplary embodiment, the gradient is linear and is at a predetermined angle a which can be defined on an application-specific basis. Further shapes of the gradients may be convex, concave or free-forms. A multi-step gradient can likewise be advantageous.

When the input part 12 is in the state in which it has not been rotated with respect to the output part—which is not illustrated—the sliding blocks 23 are positioned at the minima against the influence of the energy stores 18, which are illustrated here as helical springs 24, and are held in a slightly prestressed form in the bearing ring 25, which is used as a counter bearing 19 for all the energy stores 18. Pockets 26 can be provided for this purpose. As a result of the uniform application of force from the energy stores 18 over the circumference, the bearing ring 25 is held in a stabilized position and is self-centering with the required accuracy. This means that no additional means are required for bearing and centering the bearing ring 25 on a central component, for example on the shaft 27 that is illustrated here. In order to compensate for any radial fluctuations which may occur, an annular gap 28 is provided between the central component and the bearing ring 25. It is self-evident that, in other exemplary embodiments and if there is an appropriate requirement, the bearing ring can be supported and centered on a central component by means of a plain bearing or roller bearing, such that it can rotate.

Figure 3:
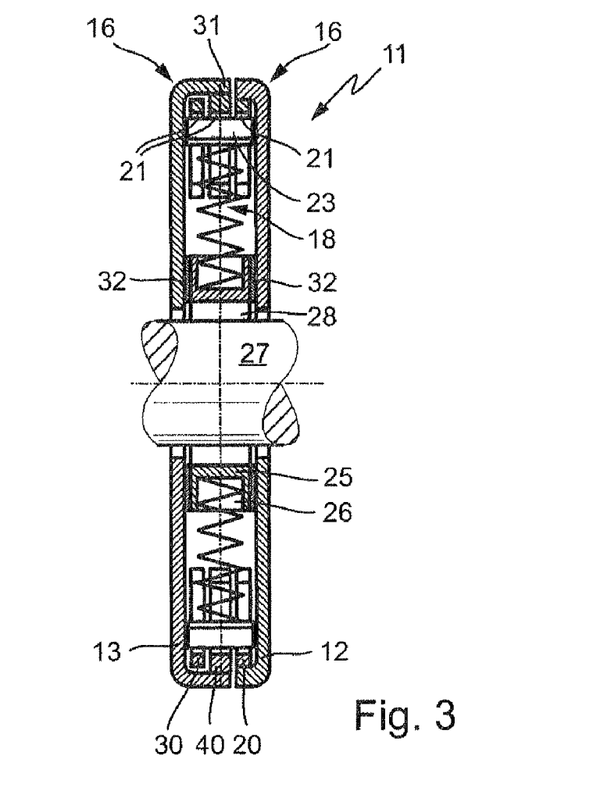
FIG. 3 Shows a longitudinal section through the rotary oscillation damper shown in FIG. 2.

FIG. 3 shows the rotary oscillation damper 11 as shown in FIG. 2 in the form of a section with the two components 16 as an input part 12 and as an output part 13. As can be seen from this illustration, the input part 12 has, in addition to the movement profiles 20, further movement profiles 30 which are axially separated therefrom and whose profiles are identical. The movement profiles are firmly connected in an advantageous way to the input part 12, for example by means of webs which are not illustrated and pass through slots which are provided in a corresponding manner in the output part 13, are in the form circular segments, are matched to the rotation angle of the components and, for example, can be provided in the movement profiles 40 of the output part 13. The movement profiles 40 of the output part 13 in the illustrated example are fitted for example by welding, to an axial projection 31 which is integrally formed on the external circumference of the output part, and are arranged axially between the movement profiles 20, 30 of the input part 12. In other advantageous exemplary embodiments, the movement profiles 40 may be integrally integrated in the output part 13, for example being introduced radially from the outside.

The movement profiles 40 of the output part 13 may have the same or different gradients as or than the gradients of the movement profiles 20 (FIG. 2), 30 of the input part 12. The sliding blocks 23 in each case engage axially over all the movement profiles 20, 30, 40, which are arranged over the circumference, of the components 16, and, when the components 16 are in the non-rotated state, are each positioned at their minimum 21 by the energy stores 18. As has already been shown in FIG. 2, the energy stores 18 are held at their ends opposite the sliding blocks 23 in pockets 26 of the bearing ring 25, which is used as a counter bearing for the energy stores 18, while maintaining an annular gap 28 from the shaft 27. A sliding layer 32 is in each case provided between the components 16 and the bearing ring 25, and reduces the friction during relative rotation of the components 16 with respect to one another, and therefore also any relative rotation which occurs between the bearing ring 25 and the components 16. Means to axially separate the movement profiles 20, 30, 40 may be provided between each of these movement profiles 20, 30, 40 and may be in the form of spacing studs, spacing ring segments or axially projecting rings distributed over the circumference, which can be provided on one or more movement profiles 20, 30, 40 and, likewise in conjunction with the corresponding contact surface, may have corresponding sliding layers in order to reduce the friction. The movement profile 40 advantageously has these separation means on both sides.

Figure 4:
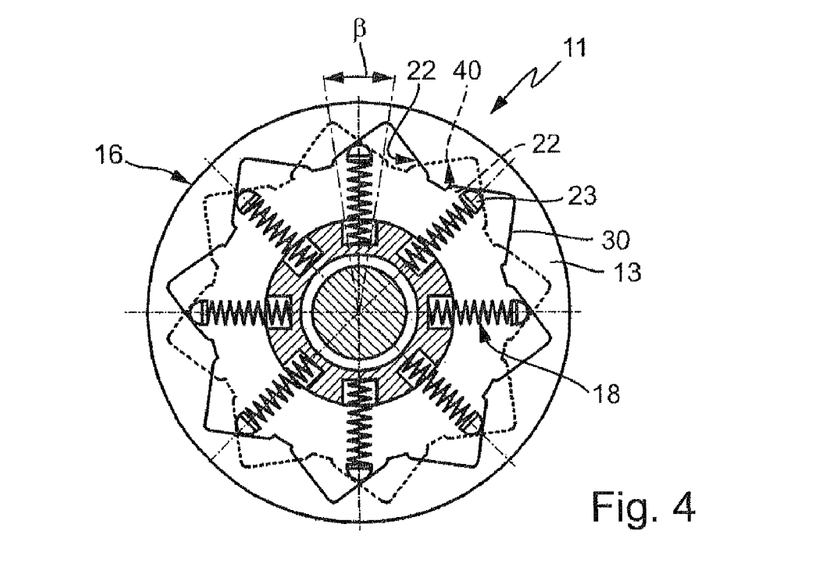
FIG. 4 Shows a view of the rotary oscillation damper as shown in FIG. 1, during a relative rotation.

FIG. 4 shows the rotary oscillation damper 11 in the case of a relative rotation of the components 16 by a rotation angle β with the movement profiles 20 of the output part 13, in which the movement profiles 40 of the output part, which cannot be seen in their own right in the illustrated view, are represented by dashed lines. As a result of the rotation of the two components 16, the gradients 22 of the movement profiles 20, 40, 30 (FIG. 3) intersect in the opposite direction, as a result of which the sliding blocks are positively moved radially inwards along these gradients, against the influence of the energy stores 18. This results in a damping effect of torsional oscillations that cause the relative rotation of the components 16, in which case a friction device may be provided in parallel and/or in series in addition to the varying energy flows in the energy stores 18. The friction effect can be produced by the friction of the sliding block 23 on the movement profiles.

Figure 5A:
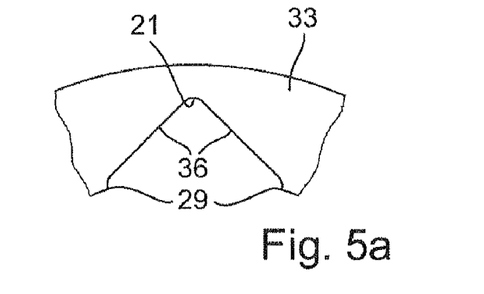
FIGS. 5a-c Show various embodiments of movement profiles.
Figure 5B:
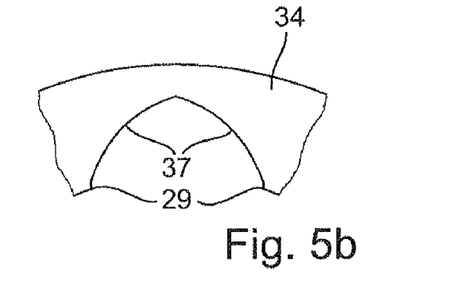
Figure 5C:
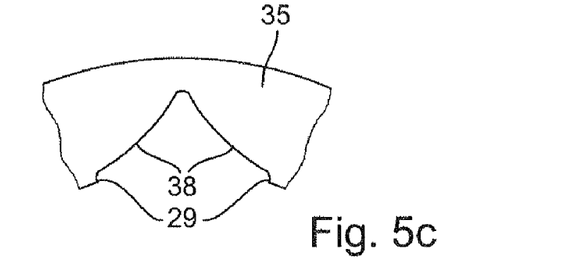

FIGS. 5a to 5c show advantageous refinement examples of movement profiles 33, 34, 35 as may be used as movement profiles 20, 30, 40 in the rotary oscillation dampers 11 described in FIGS. 2 to 4. In this case, FIG. 5a shows a profile 36 which rises linearly on both sides from the minimum 21, FIG. 5b shows a concave profile 37 and FIG. 5c shows a convex profile 38. The profiles 36, 37, 38 are each bounded by a stop 29 which the sliding blocks may strike. The selection of the profile depends on the desired damping characteristic of the rotary oscillation damper 1 (FIG. 3). By way of example, energy stores with linear characteristics can be used to provide characteristics with virtually any desired forms, for example of a linear, progressive, degressive or stepped type. It is self-evident that the range of variants is increased in the case of energy stores with correspondingly provided nonlinear characteristics and allows the rotary oscillation damper to be matched in an optimized manner to the specified precondition. In addition, a movement profile may also have a plurality of sub-profiles over its contour. For example, multistep gradients may be provided in a linear form or a nonlinear form. For example, concave contours may be provided in one sub-profile, and convex contours in another sub-profile. It can be particularly advantageous to provide a progressive embodiment of the sub-profiles with an increasing rotation angle. The sub-profiles may merge continuously into one another. In particular exemplary embodiments, corners may be provided between two sub-profiles, in such a way that switching onwards into the sub-profile which is effective for greater relative rotation takes place only when a rotation energy which is predetermined by the intensity of the corner is exceeded.

Figure 6A:
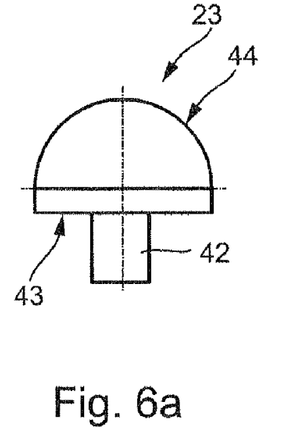
FIGS. 6a-c Show various embodiments of sliding blocks.
Figure 6B:
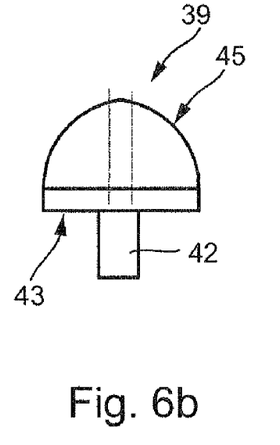
Figure 6C:
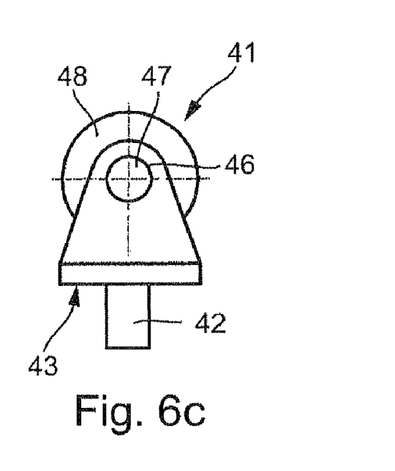

FIGS. 6a to 6c shows different sliding blocks 23, 39, 41 as may be used, for example, in the rotary oscillation damper 11 shown in FIGS. 2 to 4. The sliding blocks 23, 39, 41 have, as a common feature, a holding pin 42 with an axial stop 43, which is used to hold the energy stores, for example on an opening of a helical spring. In this case, the sliding blocks 23, 39 are mounted such that they can slide on the profiles of the movement profiles. For this purpose—as in the case of the surfaces of the movement profiles as well—the surfaces of the sliding blocks 23, 39 may be prepared, for example hardened, for such rubbing and sliding contact, and/or they may be provided with sliding layers. In particular, ceramic or plastic sliding layers may be provided. The sliding blocks 23, 39 differ in terms of their cross-sectional profiles 44, 45, which may be semicircular or composed of two circular profiles. Further exemplary embodiments may be in involute form, in conjunction with the configuration of the movement profiles. FIG. 6c shows an embodiment of a particularly low friction roller contact. For this purpose, bearings 46 are provided on the stop 43 for the shaft 47, which has a roller bearing 48 for each movement profile of the output parts, in such a way that the sliding block 41 rolls on each movement profile.

Figure 7:
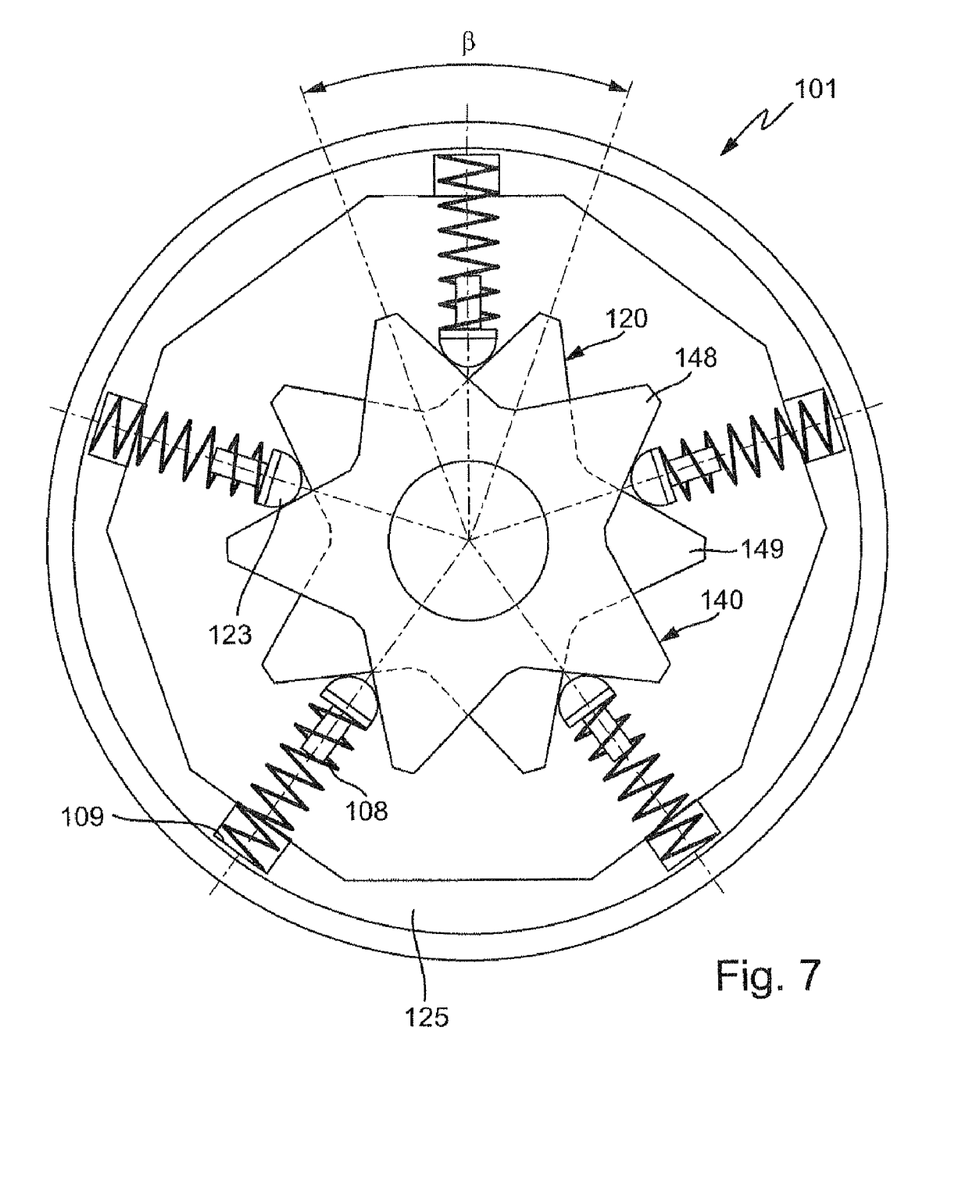
FIG. 7 Shows a view of a further exemplary embodiment of a rotary oscillation damper.

FIG. 7 shows a view of one exemplary embodiment of a rotary oscillation damper 101 with a bearing ring 125 which is arranged radially on the outside and acts as a counter bearing 109 for the energy stores 108. Disk parts 148, 149 are provided radially on the inside and are coupled to an input-drive component and, respectively, to an output-drive component. The disk parts 148, 149 are each star-shaped and thus form movement profiles 120, 140 along which the sliding blocks 123, on which the energy stores act, slide. When the two disk parts 148, 149 rotate relative to one another by the rotation angle β, the sliding blocks 123 are moved along the movement profiles in the manner corresponding to the description of FIG. 4, compressing the energy store 108.

Figure 8:
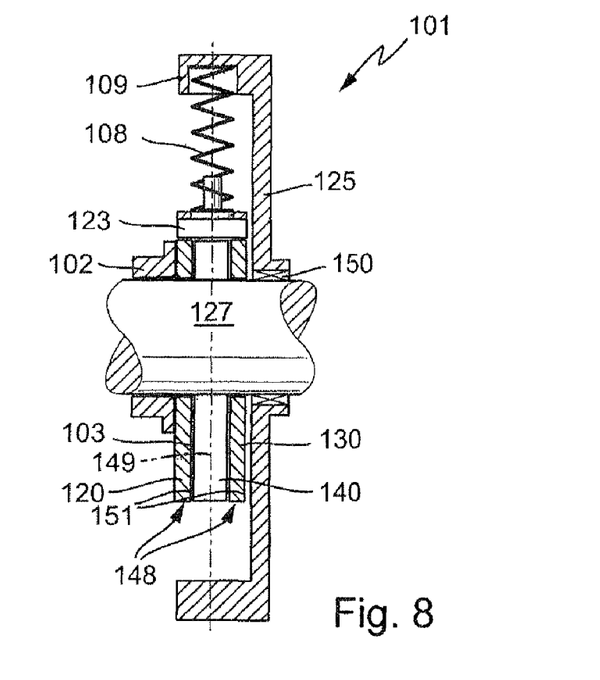
FIG. 8 Shows a longitudinal section through the exemplary embodiment shown in FIG. 7.

FIG. 8 shows the rotary oscillation damper 101 as described in FIG. 7, illustrated in the form of a section. The bearing ring 125 is held such that it can rotate and is centered on a shaft 127, for example a gearbox input shaft which acts as an output-drive shaft for the rotary oscillation damper 101, by means of a plain bearing or, as shown, by means of a roller bearing 150. The disk part 149, which is connected to the shaft 127 such that they rotate together, for example by a tooth system, is used as an output part 103 and has the movement profile 140. The input part 102 is connected, such that they rotate together, to at least one of the two disks 151 of the two-part disk part 148 by means of the movement profiles 120, 130. The sliding blocks 123 are braced by means of energy stores 108, which are supported on the counter bearings 109, and the movement profiles 120, 130, 140 act on them in the manner already described with reference to FIGS. 2 to 4.

Figure 9:
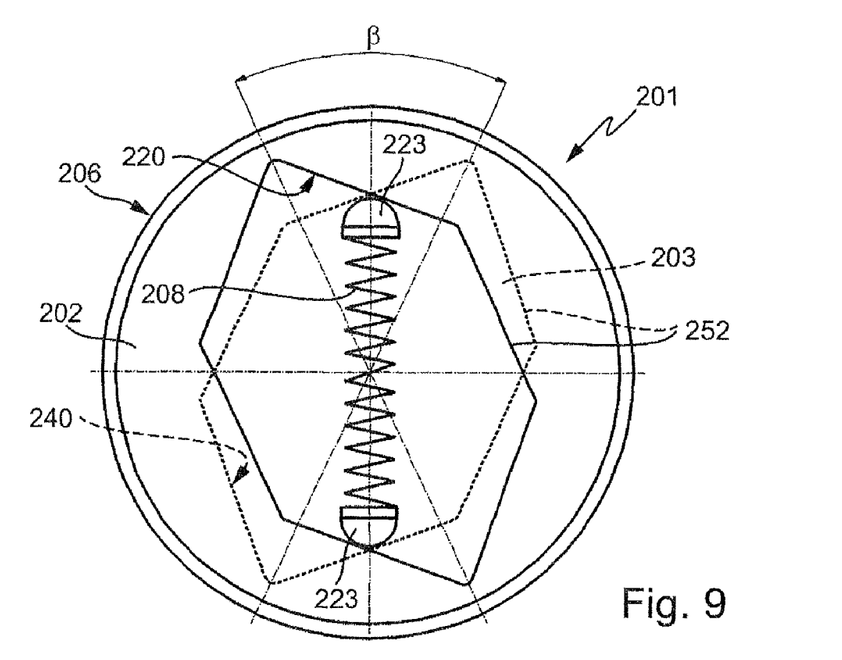
FIG. 9 Shows a view of a further exemplary embodiment of a rotary oscillation damper.

FIG. 9 shows a rotary oscillation damper 201 with an input part 202 and an output part 203 which can be moved relatively by a rotation angle β with respect thereto, as illustrated by dashed lines. Both components 206 have a cutout 252 which in each case has opposite movement profiles 220, 240, in each of which a sliding block 223 slides. The two sliding blocks 223 are braced with respect to one another by means of an energy store 208.

When the two components 206 rotate with respect to one another, the gradients of the movement profiles 220, 240 intersect, as a result of which the sliding blocks 223 are moved radially inwards, thus compressing the energy store 208 from both ends. In order to stabilize the energy stores 208, it may be held in a telescopic sleeve.

The invention claimed is:

1. A rotary oscillation damper, comprising:
   at least one energy store;
   two components, an input part and an output part, which can rotate in a limited manner with respect to one another and against an influence of the at least one energy store,
   wherein the at least one energy store has two mutually opposite force absorption points, one of the force absorption points is supported on an counter bearing and the other force absorption point is supported such that the other force absorption point can move along at least one movement profile in in a circumferential direction of the components,
   wherein each movement profile has a minimum and sliding tracks, and
   wherein the sliding tracks, which are formed between the minimum and two extreme points of the movement profile, are linear.

2. The rotary oscillation damper according to claim 1, wherein the at least one energy store is a helical spring.

3. The rotary oscillation damper according to claim 1, wherein the force absorption points of a plurality of energy stores, which are distributed over a circumference, are supported on a common opposing bearing as a bearing ring.

4. The rotary oscillation damper according to claim 3, wherein the bearing ring is supported, such that the bearing ring can rotate, on one of the components or on an additional component.

5. The rotary oscillation damper according to claim 3, wherein the bearing ring is stabilized in position by means of mutual bracing of the energy stores which are distributed over the circumference.

6. The rotary oscillation damper according to claim 1, wherein movement profiles of the input part and of the output part are the same.

7. The rotary oscillation damper according to claim 1, wherein a sliding block, which holds the other force absorption point of the at least one energy store, slides on movement profiles.

8. The rotary oscillation damper according to claim 7, wherein a profile of the sliding blocks, which slides on the movement profiles and the movement profiles slide on involute tracks.

9. The rotary oscillation damper according to claim 7, wherein the movement profiles are separated from one another axially by means of spacing tabs.

10. The rotary oscillation damper according to claim 1, wherein one component has two movement profiles, and the movement profile of the other component is guided between the movement profiles of the other component.

11. The rotary oscillation damper according to claim 1, wherein a plurality of sub-profiles are provided over a contour of a movement profile.

* * * * *